Aug. 25, 1953  F. J. GAFFNEY ET AL  2,650,347
IMPEDANCE MEASURING BRIDGE

Filed Aug. 25, 1950  2 Sheets-Sheet 1

INVENTORS
FRANCIS J. GAFFNEY
HERBERT A. FINKE

BY Ralph B. Stewart

ATTORNEY

Aug. 25, 1953   F. J. GAFFNEY ET AL   2,650,347
IMPEDANCE MEASURING BRIDGE
Filed Aug. 25, 1950   2 Sheets-Sheet 2

INVENTORS
FRANCIS J. GAFFNEY
HERBERT A. FINKE

BY Ralph B. Stewart
ATTORNEY

Patented Aug. 25, 1953

2,650,347

UNITED STATES PATENT OFFICE 2,650,347

IMPEDANCE MEASURING BRIDGE

Francis J. Gaffney, Malverne, and Herbert A. Finke, New York, N. Y., assignors to Polytechnic Research and Development Company Incorporated, Brooklyn, N. Y., a corporation of New York Application August 25, 1950, Serial No. 181,412

9 Claims. (Cl. 324—58)

This invention relates to impedance measuring bridges and resistance standards therefor. More particuuarly it relates to impedance bridges and resistance standards for use in that band of the frequency spectrum which lies substantially between 50 and 1000 megacycles per second.

It is well known that there are many difficulties connected with extending the use of conventional bridges to the ultra high frequency range. Ordinary circuit components are unsatisfactory and become more so the higher the frequency range is extended. It has already been proposed to utilize transmission lines for high frequency bridges. Several forms are disclosed in the U. S. patent to Barrow 2,416,790.

It is an object of this invention to provide a distributed parameter bridge of the null type which will be direct reading.

Another object of this invention is the use of a grounded-grid triode as a variable standard of resistance.

A further object is to combine in a coaxial line bridge circuit, elements which readily adapt themselves to high frequency use.

In order to achieve the above and other objects of this invention which will appear hereinafter, use is made of a pair of identical impedances for the ratio arms of the bridge, and the known arm is formed of a grounded grid triode connected in parallel with a calibrated reactance. The former supplies the real part of the known impedance while the latter supplies the imaginary or quadrature part. The bridge may be balanced by varying the known arm until a null indication is reached. By providing means for indicating the resistance of the grounded grid triode, the unknown impedance may then be read directly from the indicating means and the calibrated reactance.

The invention will now be described with more particularity by reference to the attached sheets of drawing in which.

Figure 1:
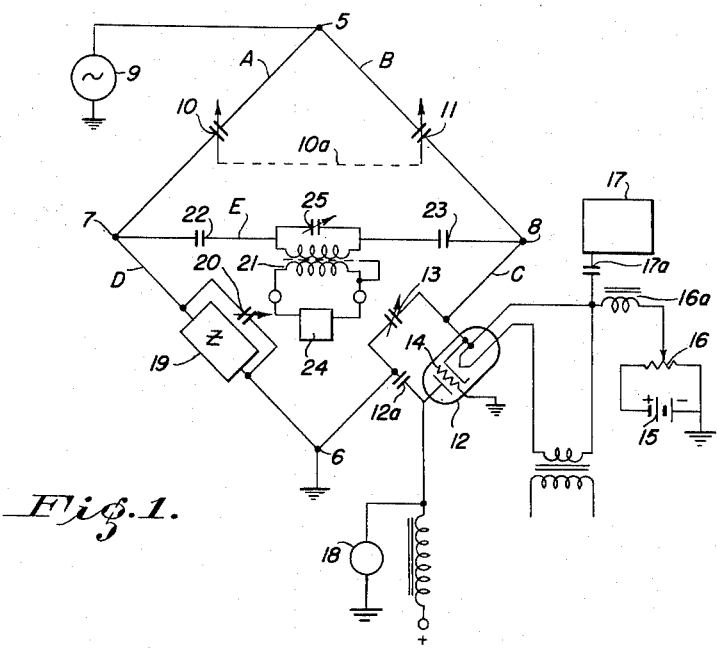
Figure 1 is a schematic circuit diagram of the bridge.

Referring now to the schematic circuit shown in Figure 1, the bridge is formed of four arms A, B, C and D connected between a pair of input diagonal points 5 and 6 and a pair of output diagonal points 7 and 8. A source of ultra high frequency waves 9 is connected to point 5 and point 6 is grounded. The two arms A and B connected to point 5 include variable capacitors 10 and 11 of the same size, the movable members of which are mechanically coupled, as shown at 10a, so that regardless of the setting, the capacitance of 10 always equals the capacitance of 11. These two capacitors then serve as the ratio arms of the bridge and provide adjustment of the bridge sensitivity over a wide range of frequency. As will be explained later these two condensers in the distributed parameter bridge are embodied in the center conductor of coaxial cable sections forming the ratio arms of the bridge. It is not essential to use capacitors since any pair of equal impedances could be used to fulfill the same function.

The arm of the bridge connected between points 6 and 8 includes tube 12 and the calibrated condenser 13 connected in parallel, and these elements form the real and imaginary parts respectively of the known impedance. A blocking condenser 12a prevents the flow of direct current from the plate of tube 12 to ground. Grid 14 of tube 12 is grounded, and an adjustable cathode bias circuit is provided for the tube which may be simply a battery 15 and potentiometer 16 having its slider connected to the cathode through a choke 16a, as shown. It has been found that triodes such as Western Electric type 416A with grounded grid, and with a zero radio frequency impedance plate load, may be used as a resistance standard over a wide range of frequency. The value of this resistance is very nearly equal to the reciprocal of the transconductance of the tube and its value, of course, may be adjusted by varying the cathode bias or by varying the plate voltage. In order to know the value of this resistance, a low frequency test signal from a source indicated at 17 is fed to the input of the tube through a blocking condenser 17a. A vacuum tube voltmeter 18 calibrated in resistance and connected across the output of the tube serves as a direct reading resistance indicator.

It should be apparent that the use of such a standard of resistance is by no means limited to a high frequency bridge but in fact should find wide application throughout the electrical industry wherever a variable standard precision resistance is needed over a wide band of frequencies.

The equivalent circuit for a grounded grid triode with a zero impedance plate load may be taken as a variable resistance shunted by a condenser. It has been determined experimentally that the measured input impedance for grounded grid operation is equal to the reciprocal of the transconductance shunted by the interelectrode capacity, within the accuracy of measurement. A tube for example such as a Bell Telephone Laboratories type 1553, which has a maximum transconductance of about 50,000 and upper operational frequency limit of about 4000 megacycles, is ideally suited for this type of operation.

The fourth arm D of the bridge includes the unknown impedance indicated at 19 in the drawing. Variable condenser 20 connected in parallel with the unknown impedance is uncalibrated but is placed in the bridge circuit in order that inductive as well as capacitive reactances can be measured by application of conventional substitution techniques.

The above completes the four arms of the bridge circuit. The output or null circuit E of the bridge is connected across points 7 and 8 and is coupled to the detector terminals through a balanced - to - unbalanced electrostatically shielded transformer 21, so as to provide a grounded output terminal for the bridge. This arrangement also permits grounding of the center conductor of the coaxial line system without disturbing the radio frequency field, thus providing a direct current return for the tube 12. Direct current blocking condensers 22 and 23 are inserted in series with the primary winding of transformer 21. The secondary winding of transformer 21 is connected to a suitable external detector and indicator 24.

Since for optimum sensitivity it is desirable to maintain a reasonably high impedance across the detector arm, condenser 25 is connected in the null circuit and across the primary of transformer 21 to vary the electrical length of the output lead which would otherwise present a low impedance to the bridge at certain critical frequencies.

Figure 2:
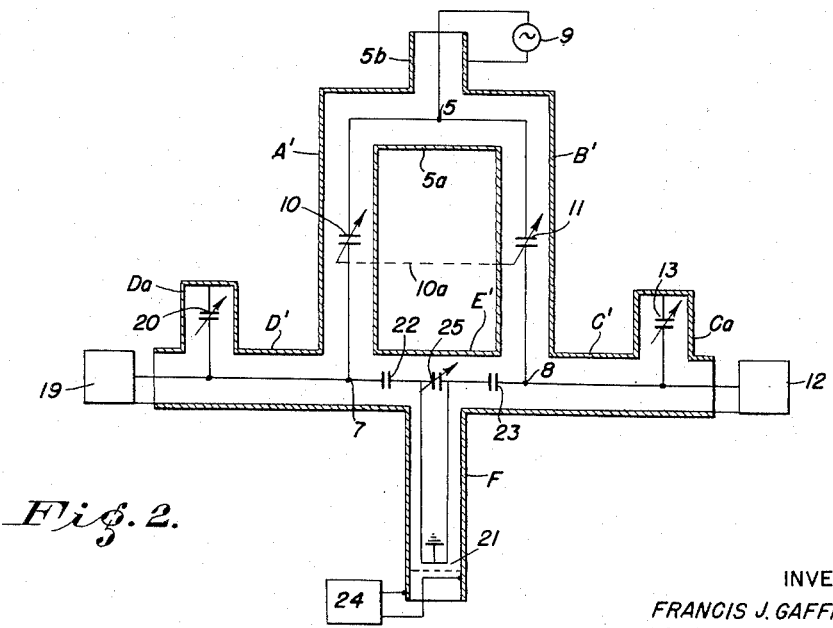
Figure 2 is a block diagram of the distributed parameter bridge.

The foregoing description covers the schematic circuit shown in Figure 1. Figure 2 shows the salient features of the bridge as embodied in a coaxial structure, the corresponding parts being given the same reference numerals as in Figure 1.

As shown in Figure 2, the two ratio arms of the bridge embodying variable condensers 10 and 11 are formed of two coaxial cable sections A' and B' arranged in parallel relation and joined at their upper ends by a cable section 5a containing the bridge terminal 5 which is connected to the source 9 through cable section 5b connected to the center of cable section 5a. The lower ends of cable section A' and B' are joined by cable section E' which forms the null circuit of the bridge. A cable section C' forming the third arm of the bridge is joined to sections B' and E' at their junction to form the bridge point 8, and another cable section D' is joined to sections A' and E' at the point of junction to form the bridge point 7. The known resistance element including the tube 12 is connected to the outer end of cable section C', and the variable condenser 13 arranged in shunt with this resistance is embodied within a stub cable section Ca. In a similar manner the unknown impedance 19 is connected to the outer end of cable section D' and variable condenser 20 arranged in shunt with this impedance is embodied in a stub cable section Da. A two-conductor cable section F joined to the cable section E' at the middle thereof connects the null circuit with the detector and indicator 24 and embodies the coupling transformer 21 therein.

As shown in Figure 2, it is convenient to arrange cable sections C', D' and E' in alignment, and these sections may be formed of one continuous length of cable, but it is not necessary that this aligned relation be used. For example, cable sections C' and D' may be aligned with sections B' and A' respectively.

Figure 3:
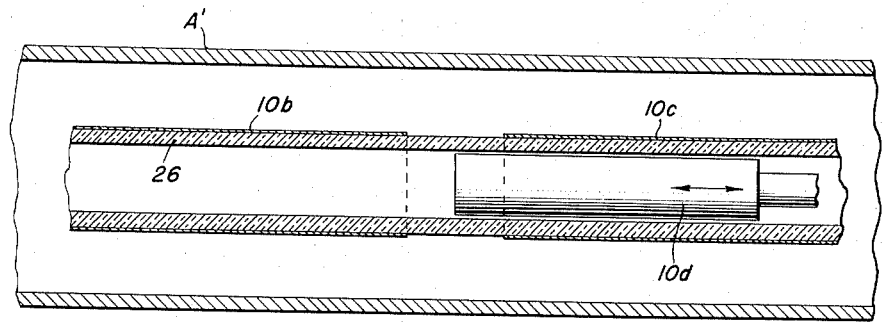
Figure 3 is drawing in section of one of the coaxial condensers.

Figure 3 is an enlarged sectional view of a cable section showing the structure of the variable coaxal condensers which are used as condensers 10 and 11 in the ratio arms of Figure 2, and the same construction may be used for condensers 13, 20 and 25. The outer conductor of the cable is shown at A'; the inner conductor has a linear section formed of a dielectric (glass) tube 26 the outer surface of which is coated with a low resistance metallic film formed in two sections 10b and 10c separated by a non-conductive gap having a length of about one inch for a 50 ohm line. A metallic plunger 10d is arranged to slide within the tube 26 to bridge the gap. When the plunger is entirely withdrawn into one section of the film coating, the capacitance between the two sections of metal film is substantially zero, and as the plunger is inserted to bridge the gap the capacitance increases. These condensers are effectively connected in series with the center conductor of the coaxial lines as indicated in the block diagram of Figure 2.

Figure 4:
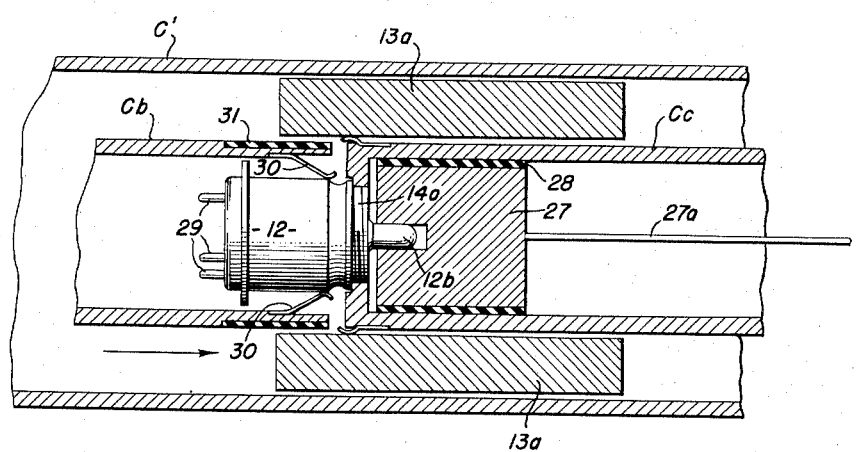
Figure 4 is a view partially in section showing a preferred type of tube and coaxial mounting therefor.

Figure 4 is an enlarged sectional view of cable section C' showing how tube 12 is mounted therein and also showing another form of variable condenser serving as condenser 13. The outer conductor of the cable is shown at C' and the inner conductor is formed of two separated tubular sections Cb and Cc. The tube 12 is mounted within section Cb and has a part extending into section Cc. The grid ring 14a of the tube has threaded connection with a threaded aperture in the end wall of section Cc, the outer end of which is grounded or connected to the outer conductor C'. The plate prong 12b of tube 12 extends into a socket formed in a connector plug 27 mounted within conductor section Cc and being insulated therefrom by insulating cylinder 28. The lead 27a connects the plug 27 to the source of plate current for tube 12. Connections for energizing the filament of tube 12 are brought in through conductor section Cb and are connected to prongs 29. The outer conductive shell of tube 12 which is connected to the cathode of the tube is electrically connected with conductor section Cb by suitable spring connectors 30, and conductor section Cb is connected to bridge point 8 as shown diagrammatically in Figure 1.

One form of variable condenser 13 is provided by arranging a conductive sleeve 13a within the annular space surrounding the conductor sections Cb and Cc and the outer conductor C', the sleeve being electrically connected to conductor section Cc by suitable spring connectors and being slidable to overlap the end of conductor section Cb by varying amounts, thereby providing a variable capacity coupling between conductor sections Cb and Cc. If desired, an insulating ring 31 may be provided on the end portion of conductor section Cb to prevent metallic contact between sleeve 13a and conductor section Cb. Instead of using the sleeve 13a, the condenser 13 may take the form shown in Figure 3 and be embodied in a stub cable section Ca as shown in Figure 2. In general, condenser 13 is constructed with close spacing and minimum length so as to minimize frequency dependence.

The manner of using the impedance bridge is believed to be obvious. The unknown impedance 19 is connected to the end of cable section D' constituting the fourth arm of the bridge, and condenser 13 and potentiometer 16 are adjusted until there is zero response or indication on the indicator 24. The settings of condenser 13 and potentiometer 16 provides an indication of the impedance of the unknown element 19.

If the unknown element contains inductance, condenser 20 may be initially adjusted so that the net reactance to be balanced including the unknown is always capacitive. Then, insertion of the unknown will cause condenser 13 to be decreased to restore balance and this incremental decrease in condenser 13 is the capacity required to resonate the unknown inductance at the frequency of measurement. The inductance can then be determined by computation.

The embodiments of the invention in which an exclusive right is claimed are defined as follows:

1. A direct reading impedance measuring bridge comprising, in combination, a pair of impedance elements connected as ratio arms of the bridge, a variable standard impedance connected as the third arm of the bridge and including a grounded-grid triode serving as the real component and a calibrated reactance serving as the quadrature component of said standard, means affording connection of an unknown impedance as a fourth arm of the bridge, a low frequency signal source connected to the input of said triode, a variable bias circuit connected to said triode, indicating means responsive to the plate voltage of said triode and affording continuous measurement of the resistance of said triode, means affording connection of a high frequency signal source across one pair of diagonal junction points of said bridge, and means affording connection of a bridge balance indicator across the other pair of diagonal junction points of said bridge.

2. A bridge as defined by claim 1 in which the ratio arms comprise substantially identical variable reactances, and means mechanically coupling said reactances for simultaneous operation, in order to provide adjustment of bridge sensitivity while maintaining bridge balance.

3. A direct reading four-arm impedance measuring bridge comprising, in combination, a pair of variable condensers having substantially equal capacitance values connected as ratio arms of the bridge, a mechanical coupling between the movable elements of said variable condensers to maintain equality of capacitance of said condensers for all settings to provide means for varying bridge sensitivity, a variable standard of impedance connected as the third arm of the bridge and including a grounded-grid triode serving as the real component and a variable calibrated condenser connected in parallel with said triode and serving as the quadrature component of said standard, means affording connection of an unknown impedance as the fourth arm of the bridge, a low frequency signal source connected to the input of said triode, a variable bias circuit connected to said triode, indicating means affording continuous measurement of the resistance of said triode, means affording connection of a high frequency signal source across one pair of diagonal junction points of said bridge, and means affording connection of a bridge balance indicator across the other pair of diagonal junction points of said bridge.

4. A bridge according to claim 1 wherein said ratio arms are formed of sections of coaxial cable, and the condenser in each ratio arm is formed of a gap in the center conductor of the cable section, and a conducting member arranged within said section and being movable longitudinally thereof to variably bridge said gap.

5. A bridge according to claim 4 wherein the gap section of the center conductor of each ratio arm is formed of a tube of dielectric material carrying spaced conductive coating on the outer surface thereof, and said movable bridging member comprises a conducting plunger positioned within said tube.

6. A variable standard of impedance for use in bridge circuits comprising, in combination, a grounded-grid triode, a variable calibrated reactance connected in parallel with said triode, means connected to the plate of said triode constituting a zero radio frequency load, a low frequency signal source connected to the input of said triode, a variable bias circuit for said triode, and indicating means connected in the output circuit of said triode and being responsive to the plate voltage thereof to indicate the resistance of the triode for all settings of said bias circuit.

7. A variable impedance for ultra-high frequency waves comprising, in combination, a section of coaxial cable adapted for connection at one end to a source of ultra-high frequency waves and having the inner conductor thereof formed of input and output longitudinal sections spaced apart to provide an air gap between said sections, said inner conductor sections being of tubular form adjacent said air gap, and the output section thereof being grounded, a triode positioned within one of said tubular sections and having the anode terminal thereof extending into the other tubular section, means providing a connection between the tubular section enclosing said triode and the cathode of said triode, means providing conductive connection between the grid of said triode and the grounded section of the said center conductor, capacitive means of substantially zero impedance to ultra-high frequency waves for connecting the anode of said triode to the grounded section of said center conductor, an anode-cathode circuit for said triode including a source of current, and means for varying the space current in said triode.

8. A variable impedance according to claim 7 and including a conductive sleeve surrounding the inner conductor of said cable section and being movable longitudinally thereof to variably bridge said gap.

9. A variable impedance device for ultra-high frequency waves comprising, in combination, a section of coaxial cable adapted for connection at one end to a source of ultra-high frequency waves and having the inner conductor thereof formed of input and output longitudinal sections spaced apart to provide an air gap between said sections, one of said sections being of tubular form adjacent said air gap, and the output section thereof being grounded, a triode positioned within said tubular section, means providing a conductive connection between said input section and the cathode of said triode, means providing a conductive connection between the grid of said triode and the grounded section of the said center conductor, capacitive means of substantially zero impedance to ultra-high frequency waves for connecting the anode of said triode to the grounded section of said center conductor, and a conductive sleeve surrounding the inner conductor of said cable section and being movable longitudinally thereof to variably bridge said gap.

FRANCIS J. GAFFNEY.
HERBERT A. FINKE.

References Cited in the file of this patent

UNITED STATES PATENTS

| Number | Name | Date |
|---|---|---|
| 1,579,708 | Jammer et al. | Apr. 6, 1926 |
| 1,718,557 | Hickok | June 25, 1929 |
| 2,178,954 | Dehmel | Nov. 7, 1939 |
| 2,312,982 | Stenning | Mar. 2, 1943 |
| 2,341,655 | Van B. Roberts | Feb. 15, 1944 |